(12) United States Patent
Li et al.

(10) Patent No.: US 7,949,608 B2
(45) Date of Patent: May 24, 2011

(54) ENABLING A SOFTWARE SERVICE PROVIDER TO AUTOMATICALLY OBTAIN SOFTWARE SERVICE

(75) Inventors: Ying Li, Haidian (CN); Ying Chen, Beijing (CN); Zhong Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1427 days.

(21) Appl. No.: 11/412,585

(22) Filed: Apr. 27, 2006

(65) Prior Publication Data

US 2006/0245564 A1    Nov. 2, 2006

(30) Foreign Application Priority Data

Apr. 29, 2005    (CN) .......................... 2005 1 0068430

(51) Int. Cl.
*G06F 21/00*    (2006.01)
(52) U.S. Cl. ............................................. 705/59; 705/51
(58) Field of Classification Search ...................... 705/59
See application file for complete search history.

(56) References Cited

U.S. PATENT DOCUMENTS

| | | | |
|---|---|---|---|
| 6,816,882 | B1 | 11/2004 | Conner et al. |
| 7,096,360 | B1 * | 8/2006 | Fries ............................ 713/168 |
| 7,197,466 | B1 * | 3/2007 | Peterson et al. ............... 705/1.1 |
| 2001/0044781 | A1 | 11/2001 | Shutes |
| 2002/0022971 | A1 | 2/2002 | Tanaka et al. |
| 2002/0078203 | A1 | 6/2002 | Greschler et al. |
| 2003/0200541 | A1 | 10/2003 | Cheng et al. |
| 2003/0217171 | A1 * | 11/2003 | Von Stuermer et al. ...... 709/231 |
| 2004/0068731 | A1 | 4/2004 | Davis et al. |
| 2004/0148394 | A1 * | 7/2004 | Circenis et al. ............... 709/226 |
| 2004/0267590 | A1 | 12/2004 | Clark et al. |
| 2006/0293942 | A1 * | 12/2006 | Chaddha et al. ................. 705/8 |

OTHER PUBLICATIONS

Elfatatry, Layzell, Sorfware as a Service: A Negotiation Perspective, Dept of Computation, UMIST, UK.

A. Elfatatry et al.; "Software As a Service: A Negotiation Perspective;" Proceedings of the 26th Annual Internation Computer Software and Applications Conference (COMPSAC'02); 2002 IEEE.

\* cited by examiner

*Primary Examiner* — Andrew J. Fischer
*Assistant Examiner* — Chrystina Zelaskiewicz
(74) *Attorney, Agent, or Firm* — Cantor Colburn LLP; Vazken Alexanian

(57) ABSTRACT

Methods, and apparatus, enabling an originating service provider to automatically obtain from a $3^{rd}$ party service provider and run a software service online. Method comprising: originating service provider negotiating license with $3^{rd}$ party service provider over certain software service run by $3^{rd}$ party service provider; license stipulating life cycle information of software service, enabling originating service provider to automatically obtain software service; $3^{rd}$ party provider delivering software service to originating service provider in response to agreements of license; and originating service provider automatically deploying software service in self-hosted environment according to stipulation of the license. Based on the method and apparatus of the present invention, the service provider can automatically and flexibly obtain a software service to reduce costs of the service provider and ensure quality of the software service, and facilitate the expansion of software service filed and software service update.

1 Claim, 7 Drawing Sheets

| service | purchaser | purchase model | leasehold | status |
|---------|-----------|----------------|-----------|--------|
| service A | SP_1 | lease for period of time | 1 month | on |
| service B | SP_1 | lease for period of time | 0.5 month | off |
| service C | SP_2 | buy one license | | on |
| service D | SP_3 | buy the service | | off |
| ... | | | | |

ENABLING A SOFTWARE SERVICE PROVIDER TO AUTOMATICALLY OBTAIN SOFTWARE SERVICE

TECHNICAL FIELD

The present invention relates to information technology. More particularly, the present invention relates to a method and apparatus for enabling a software service provider to automatically obtain and run software service online.

DESCRIPTION OF THE RELATED ART

The ubiquity of the Web and Internet has now enabled companies of every size to take full advantage of the power, simplicity, and flexibility of services-based business computing. What was once known as outsourcing has evolved into today's Software as a Service (SaaS). Today, many companies are choosing to move their applications from Host and Client/Server-based architectures to a Service Oriented Architecture (SOA) in order to reap the benefits associated with the standard and high efficiency brought about by Web- and Internet-based services.

One of the key foundations of the method of Software as a Service is the software service provider. The software service provider is usually a third-party company or organization that hosts applications or services for individuals or businesses. A client can have access to applications by connecting via Internet or leaseline to a data center maintained by the software service providers. However, these applications do not need to be installed onto a local server or a personal computer of the client. Thus, owing to the existence of the software service providers, the client can save space of magnetic disk necessary for the installation of applications or services or save expenditure for managing and maintaining applications. The software service providers may comprise application software service providers and system software service providers and the like, which are generally called "Service Providers" for the sake of brevity in the present application. Moreover, a "software service" is also briefly called as "Service" in the present application.

FIG. 8 schematically shows the case that the Service Provider 810 provides services for the clients 821-824 in a SaaS model. The Service Provider 810 deploys some services in its service hosting environment 820 (for brevity and convenience, FIG. 8 only schematically shows two services 831, 832). The Service Provider 810 implements a service 831 in its hosting environment to provide services for clients 821 and 822 and implements a service 832 to provide services for clients 823 and 824. It is unnecessary for the clients themselves to run services.

During the dot-com boom of the late 1990's, leading Service Providers were typically large organizations with massive resources built around data center infrastructure that targeted Fortune 500 accounts. Today, as more of the baseline hardware, networking and software to support software as a service has become commoditized, Service Providers have taken on many shapes and cater to companies of virtually every size. It can be asserted that, today's Service Providers are a mix of companies who are adding Software as a Service to their traditional offerings and operations.

Although the current Service Providers varies, their modes for obtaining services are nothing more than two types. The following is an example for illustration.

Supposing Service Provider A is an application service provider for providing client relationship management (CRM) software, he finds in the current market a spatial data mining software that can be used for providing his client (such as China Telecommunications) with advanced geographical-position-based client relationship analysis.

In the meantime, the spatial data mining software is possessed by the other application service provider B and is being implemented to thereby provide the service for the client of B. That is to say, it is unnecessary for the client of B to install the spatial data mining software, but only necessary to issue a request for B to implement the software, perform mining and analysis, and return the analysis result to the client. This is "SaaS" model for said spatial data mining software.

At present, if Service Provider A holds that the spatial data mining software of B is valuable, A can:

1) develop by himself or ask a third party to help develop the spatial data mining software, then debug and run the spatial data mining software in self-hosted environment, and provide the implemented service to his own client (this is usually called implementation purchasing" model);

2) transfer his own client' spatial data mining request to B, so that B runs the spatial data mining software, calculates the result, and then return the result to A (this is usually called a "usage purchasing" model).

As for the above model 1), Service Provider A bears the development costs by himself. Additionally, Service Provider A will also undertake greater risks because the software is developed upon the clients' request, the value of the software is hard to be foreseen and it is inconvenient for the software to be updated.

As for the above model 2), Service Provider A avoids the risks associated with development, but the quality of service (QoS) cannot be ensured. This is because the software execution completely depends on B, it is hard for A to control the quality of B's accomplishment of the client's request (for example, how many days will be taken to obtain an analysis report?) while A is the one who is directly responsible for the client.

Obviously, neither of the above two models can ensure the flexibility of Service Provider A in obtaining a software service and providing a software service for his client.

Therefore, a method and an apparatus are needed in the field to enable a service provider to automatically and flexibly obtain a software service and automatically run the software service.

SUMMARY OF THE INVENTION

In view of the above problems, the present invention proposes a method and an apparatus enabling an originating service provider to online automatically obtain from a $3^{rd}$ party service provider and run a software service.

According to one aspect of the present invention, a method of enabling an originating service provider to online automatically obtain from a $3^{rd}$ party service provider and run a software service is provided. The originating service provider and the $3^{rd}$ party service provider both providing one or more software services. The method comprises: the originating service provider negotiating a license with a $3^{rd}$ party service provider over a certain software service run by the $3^{rd}$ party service provider, the license stipulating life cycle information of the software service, so that the originating service provider is able to automatically obtain the software service; the $3^{rd}$ party service provider delivering the software service to the originating service provider in response to the agreements of the license; and the originating service provider automatically deploying the software service in the self-hosted environment according to the stipulation of the license.

According to the other aspect of the present invention, a service providing apparatus for enabling an originating service provider to online automatically obtain from a $3^{rd}$ party service provider and run a software service is provided. The originating service provider and the $3^{rd}$ party service provider both providing one or more software services. The service providing apparatus comprises: a license control section, for communicating and negotiating a license with the $3^{rd}$ party service provider, the license stipulating life cycle information of the software service, so that the originating service provider is able to automatically obtain the software service; a service delivering section, for delivering the service to the $3^{rd}$ party service provider according to the stipulation of the license; and a service deployment section, for automatically deploying in self-hosted environment the software service delivered from the $3^{rd}$ party service provider according to the stipulation of the license.

According to another aspect of the present invention, a service providing apparatus of a $3^{rd}$ party service provider for online automatically providing a software service for an originating service provider is provided. The $3^{rd}$ party service provider and the originating service provider both providing one or more software services. The service providing apparatus comprises: a license control section, for communicating and negotiating a license with the originating service provider, the license stipulating life cycle information of the software service, so that the $3^{rd}$ party service provider is able to automatically provide the software service for the originating service provider; and a service delivering section, for delivering the software service to the originating service provider according to the stipulation of the license.

BRIEF DESCRIPTION OF THE DRAWINGS

The principles of the present invention are described below with reference to the accompanying drawings and in combination with the advantageous embodiments of the present invention, in which.

In the accompanying drawings, the same or similar parts use the same or similar reference signs.

DESCRIPTION OF THE INVENTION

Figure 1:
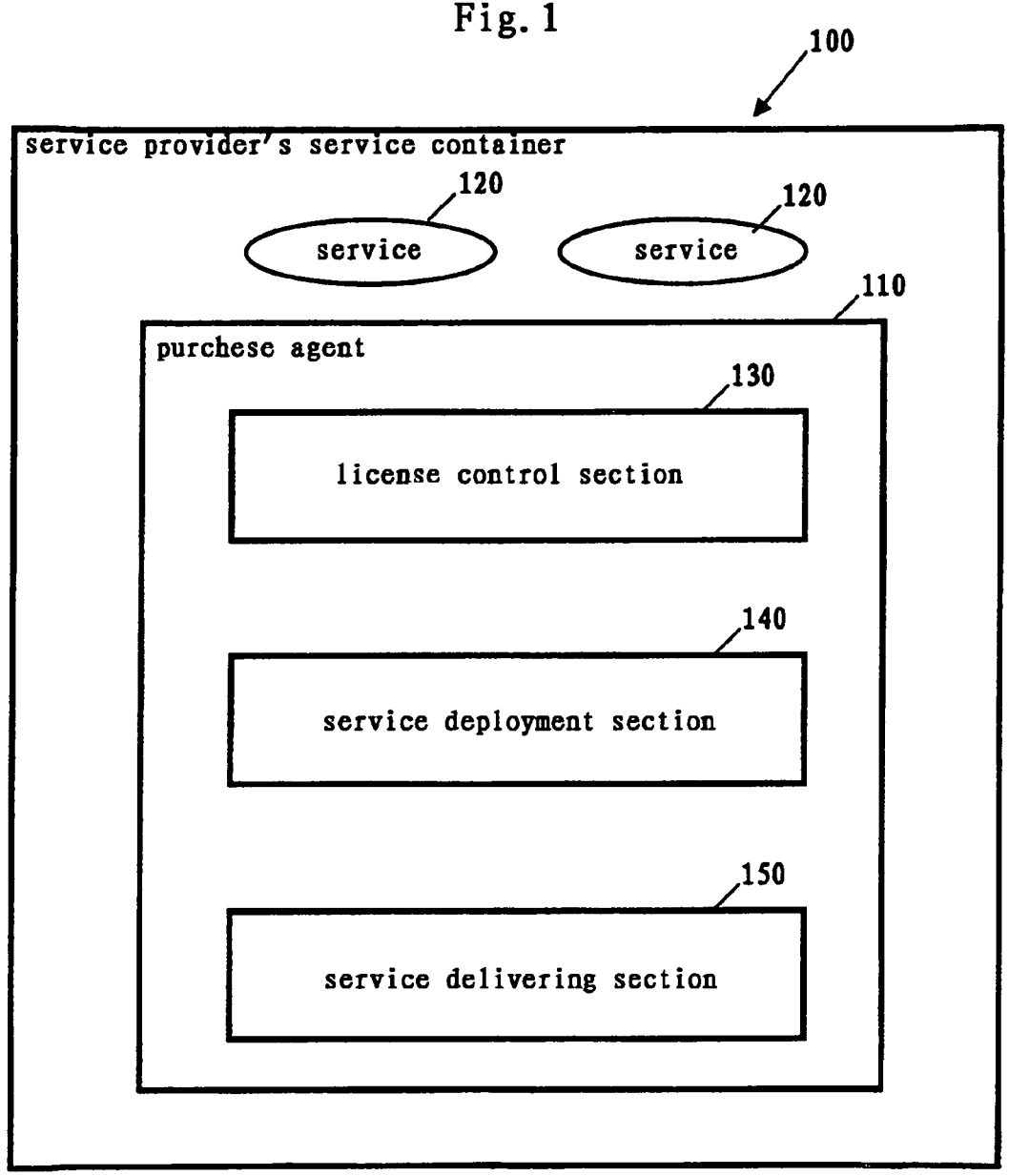
FIG. 1 is a block diagram of a service provider according to the present invention.

The present invention provides systems, methods and apparatus enabling an originating service provider to online automatically obtain from a $3^{rd}$ party service provider and run a software service. An example of a method of enabling an originating service provider to online automatically obtain from a $3^{rd}$ party service provider and run a software service is provided. The originating service provider and the $3^{rd}$ party service provider both providing one or more software services. The method comprises: the originating service provider negotiating a license with a $3^{rd}$ party service provider over a certain software service run by the $3^{rd}$ party service provider, the license stipulating life cycle information of the software service, so that the originating service provider is able to automatically obtain the software service; the $3^{rd}$ party service provider delivering the software service to the originating service provider in response to the agreements of the license; and the originating service provider automatically deploying the software service in the self-hosted environment according to the stipulation of the license.

The present invention also provides a service providing apparatus for enabling an originating service provider to online automatically obtain from a $3^{rd}$ party service provider and run a software service. The originating service provider and the $3^{rd}$ party service provider both providing one or more software services. An example of a service providing apparatus comprises: a license control section, for communicating and negotiating a license with the $3^{rd}$ party service provider, the license stipulating life cycle information of the software service, so that the originating service provider is able to automatically obtain the software service; a service delivering section, for delivering the service to the $3^{rd}$ party service provider according to the stipulation of the license; and a service deployment section, for automatically deploying in self-hosted environment the software service delivered from the $3^{rd}$ party service provider according to the stipulation of the license.

The method and apparatus in the present invention allow one service provider to automatically obtain a software service (also called a "service") from the other service provider and to deploy and run the service in self-hosted environment. This reduces the costs of the service provider on the one hand, and can also ensure the quality of service (QoS) on the other hand.

In the present invention, the originating service provider automatically obtains and runs a software service by monitoring the license. The license in the present invention stipulates life cycle information of the software service, the license being connected to a special monitoring mechanism (e.g. a timer) located in the originating service provider or the $3^{rd}$ party service provider so as to monitor the performance of the license, for example, whether or not the life cycle information begins, expires or the like. The software service can be provided in response to the commencement of a service life cycle and is removed in response to the expiration of the life cycle. It can be seen that, the present invention enables the originating service provider to automatically obtain, run and (if necessary) remove a software service by monitoring the performance of the license.

Therein, automatically obtaining a software service by the originating service provider comprises obtaining it via at least one of cloning with a timestamp, cloning or moving modes.

The present application applies the concepts "clone" and "move" in the software technology to the conventional model via which a service provider obtains a software service, so that the present invention provides for the service provider to automatically online obtain and run the service.

When the originating service provider automatically obtains a software service from the $3^{rd}$ party service provider through cloning with a timestamp, the $3^{rd}$ party service provider can keep the software service and a copy of its license in self-hosted environment. Meanwhile, in the process when the service is run in the environment provided by the originating service provider, the originating service provider or the $3^{rd}$ party service provider sets a timer to monitor whether or not the timestamp expires and automatically remove the service in the environment provided by the originating service provider when the timestamp expires.

When the originating service provider obtains a software service from the $3^{rd}$ party service provider via the cloning mode, the case is similar to that through cloning with a timestamp. However, there is no restriction on expiration of the timestamp.

When the originating service provider obtains a software service from the $3^{rd}$ party service provider via the moving mode, the $3^{rd}$ party service provider integrally remove the software service in the self-hosted environment.

Through the above different modes for automatically obtaining a software service, the service provider is capable of determining the model for obtaining a software service based on the current market value of the software service. Therefore, the risks of the service provider for providing a certain software service are reduced, so that the provided software service can be quickly updated. Accordingly, the service provider has a flexible scalability so as to easily expand the service area.

In addition, according to the method and apparatus of the present invention, the obtained software service can be hot-deployed. Thus, the software service is deployed to the hosting environment of the originating service provider during run-time, but is unnecessary to be interrupted. Consequently, the automaticity of the present invention can be further improved and the originating service provider can more conveniently perform operation.

The present invention also provides a service providing apparatus of a $3^{rd}$ party service provider for online automatically providing a software service for an originating service provider is provided, the $3^{rd}$ party service provider and the originating service provider both providing one or more software services. An example of a service providing apparatus comprises: a license control section, for communicating and negotiating a license with the originating service provider, the license stipulating life cycle information of the software service, so that the $3^{rd}$ party service provider is able to automatically provide the software service for the originating service provider; and a service delivering section, for delivering the software service to the originating service provider according to the stipulation of the license.

The advantageous embodiments of the method and apparatus according to the present invention are explained as follows by referring to the accompanying drawings. First of all, the composition of the service provider in the present invention is discussed. The present invention involves two parties of service provides. Thus, for convenient explanations, a party requiring to obtain a software service is defined as "an originating service provider", while a party from which the originating service provider obtains a software service is defined as "a $3^{rd}$ party service provider". Similarly, for convenient explanations, one originating service provider and one $3^{rd}$ party service provider are taken as examples to describe the present invention. However, it should be understood that, the number of service providers has nothing to do with the implementation of the present invention. Any number of originating service providers or $3^{rd}$ party service providers can participate in the implementation of the method in the present invention.

In the present invention, any service provider can be either an originating service provider or a $3^{rd}$ party service provider. Since the present invention mainly relates to the improvement in the aspect of an originating service provider, the implementation of the present invention does not require a $3^{rd}$ party service provider to have the same structure as the present invention. However, it is preferable that the $3^{rd}$ party service provider have the same structure as the present invention. Moreover, in the implementation process of the present invention, the originating service provider and the $3^{rd}$ party service provider are peer-to-peer, namely, they can be originating service provider or $3^{rd}$ party service provider with respect to each other. Further, as aforesaid, "software service" is also briefly called "service" in the present application.

FIG. 1 shows the service provider in the present invention has a service container 100 which comprises two main parts, a purchasing agent 110 and software services A, B collectively represented by a sign 120 (it should be understood that, here are two services shown as examples, but the number of services has nothing to do with the implementation of the present invention).

The purchasing agent 110 comprises a license control section 130 for communicating with a $3^{rd}$ party service provider to negotiate a license and managing the license, the license being mainly used for managing the life cycle of a service, the present invention performing control via the license control section according to the life cycle information stipulated by the license so that the service provider can automatically obtain the service; a service deployment section 140 for deploying a service or removing a service in the hosting environment of the service provider according to the stipulation of the license; and a service delivering section 150 for delivering a service to a $3^{rd}$ party service provider.

Figure 2:
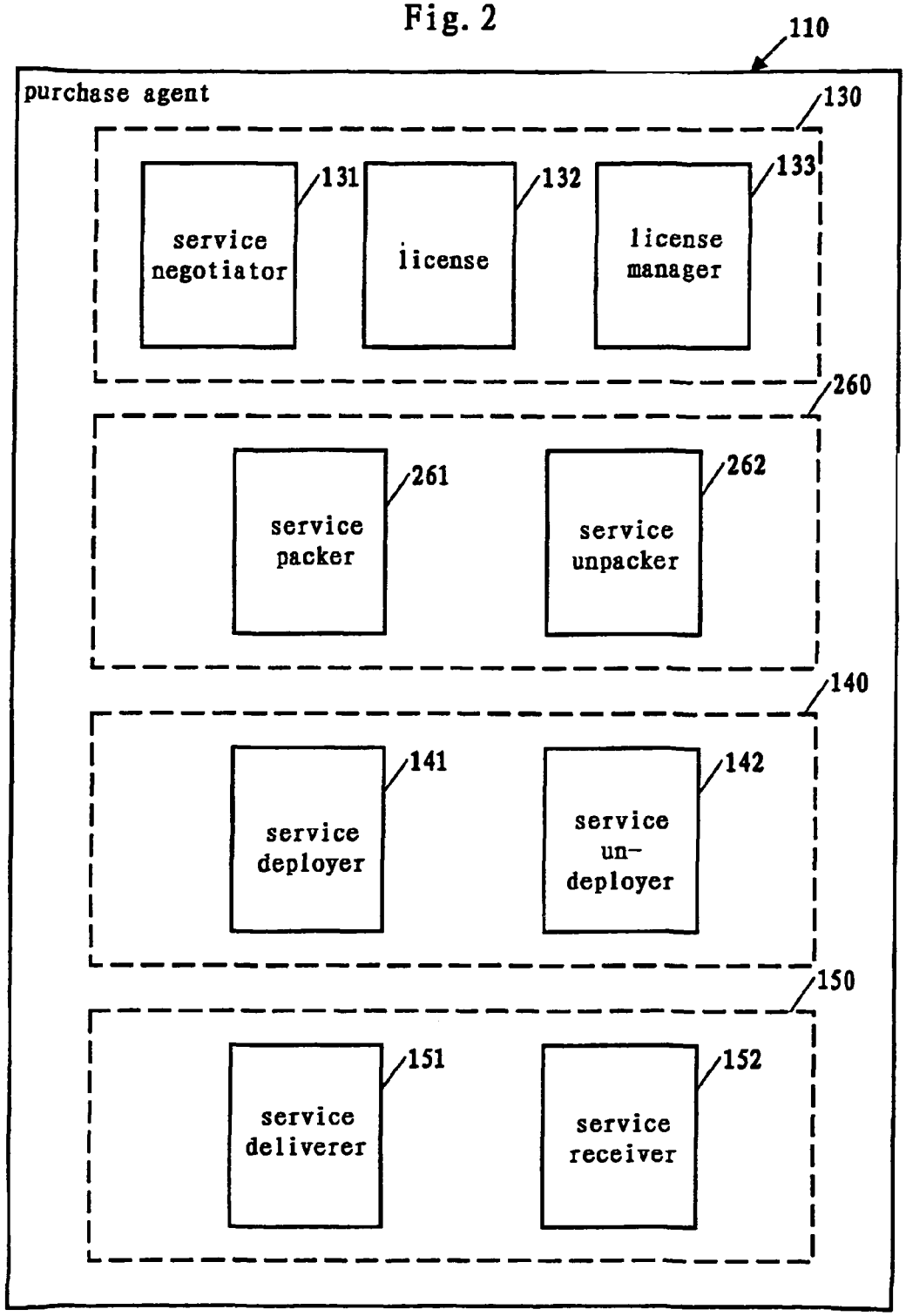
FIG. 2 is a demonstrating composition of a purchasing agent of the service provider as shown in FIG. 1.

FIG. 2 illustrates the composition of the purchasing agent 110 in an advantageous embodiment according to the present invention. According to a advantageous embodiment in the present invention, the license control section 130 further comprises a service bargainer 131 for communicating with a $3^{rd}$ party service provider to negotiate and generate a license 132, and a license manager 133 for managing the license and monitoring the performance of the license. For example, the license manager 133 can further comprise a timer that counts based on a service life cycle stipulated by the license, and when the service life cycle expires, invalidates the license or installs the service from the environment of the service provider. Detailed descriptions are as follows.

The service deployment section 140 may further include a service deployer 141 for deploying a service in the hosting environment of the service provider according to the stipulation of the license, and a service un-deployer 142 for removing the service from the hosting environment according to the stipulation of the license. Therein, the service deployer 141 can be a hot-deployer so as to deploy a service to the hosting environment of the service provider during the run-time, without the service being re-started due to the re-deployment. This further improves automaticity of the present invention.

The service delivering section 150 can further comprise a service deliverer 151 and a service receiver 152. The service deliverer 151 can further comprise parts for compressing and encrypting a service to be delivered, and the service receiver 152 can further comprise parts for decompressing and decrypting the received service so as to facilitate the delivery of the service. As those skilled in the art understand, the service delivering section 150 can adopt any proper mode (e.g. through a wireless mode, etc.) to receive or deliver a service, which does not influence the implementation of the present invention.

Moreover, the purchasing agent 110 can further comprise a service packing section 260 including a service packer 261 and a service unpacker 262. The service packer 261 is used for packing and serializing the service to be provided according to a predefined format so that the foregoing service delivering section delivers the service to the outside. The service unpacker 262 is used for unpacking and deserializing the service according to the format corresponding to the service packer so that the service deployer deploys the service in the hosting environment.

Figure 3:
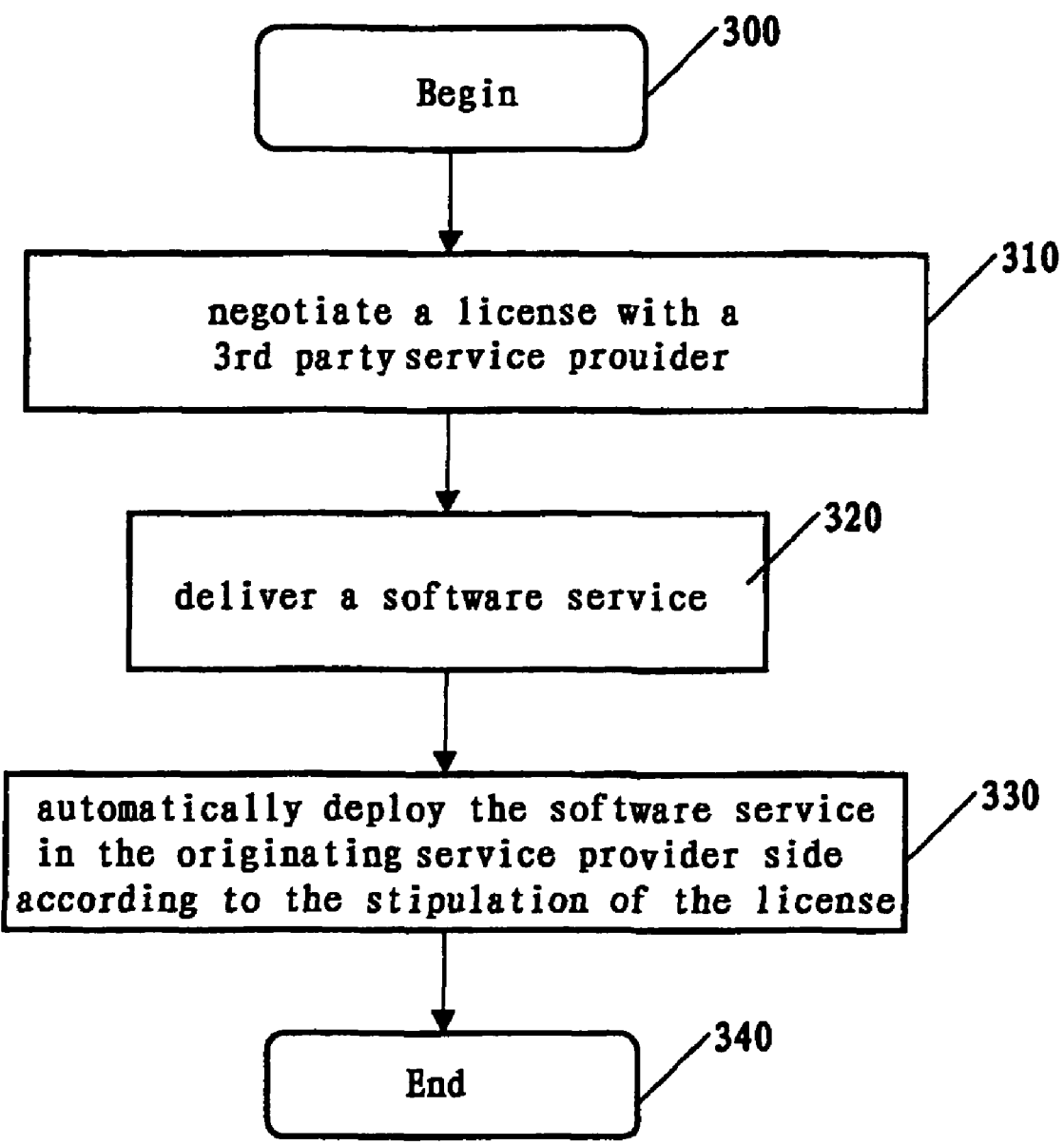
FIG. 3 is a flow diagram of the method according to the present invention.

FIG. 3 describes a workflow of the method in the present invention. Provided that an originating service provider thinks software service A run by a $3^{rd}$ party service provider is valuable to himself, the originating service provider consequently decides to obtain the service from the $3^{rd}$ party service provider. The method according to the present invention starts from step S300 and enters into step S310. In step S310, the originating service provider communicates with the $3^{rd}$ party service provider through his service bargainer to express his aspiration for obtaining the service and negotiate a license over service A. The license may stipulate for example the mode for the originating service provider to obtain a service, and may further stipulate obtaining information relating to life cycle management of the service if necessary.

Based on such factors as the operating strategy of an originating service provider or the value of a service to the originating service provider, the originating service provider may choose to obtain the service via at least one of the following three models:
1) lease for period of time (e.g. 1 month);
2) buy one license;
3) buy the service.

Correspondingly, the $3^{rd}$ party service provider provides a software service for the originating service provider by letting the software service for period of time, selling a license and selling out the service.

Corresponding to the above three models, the following three mechanisms for obtaining a service are provided:
1) Clone with a timestamp (the $3^{rd}$ party service provider still has a copy of the service; the originating service provider can only use the service within one leasehold (e.g. 1 month) and accordingly perform timing according to the timestamp of the service, when the timestamp expires, the service being automatically self-deleted from the hosting environment of the originating service provider);
2) Clone (the $3^{rd}$ party service provider still has a copy of the service, the originating service provider can use the service all the while);
3) Move (the service is removed from the hosting environment of the $3^{rd}$ party service provider and is permanently deployed to the hosting environment of the originating service provider).

Figures 4, 8:
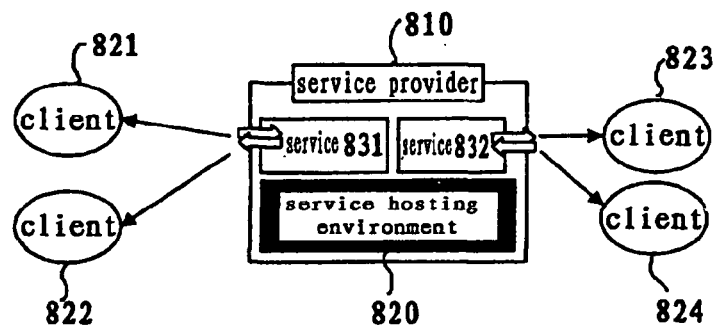
FIG. 4 is a schematic diagram of data structure of the license according to the present invention.
FIG. 8 is a schematic diagram of "Software as a Service" model.

FIG. 4 shows a demonstrating data structure of a license.

According to the present invention, an originating service provider may determine how to obtain a service based on such factors as his own requirements, or value of the service, such that a high flexibility for obtaining the service is provided.

After the originating service provider and the $3^{rd}$ party service provider negotiate a license, the method according to the present invention enters step S320. The $3^{rd}$ arty service provider delivers a software service to the originating service provider through his service deliverer and via a proper communication route.

The next is step S330, wherein after the $3^{rd}$ party service provider receives the service, the originating service provider deploys the service in self-hosted environment so as to run and provide the service for the client. Subsequently, the method of the present invention ends in step S340.

It should be understood that, before the $3^{rd}$ party service provider delivers the service, the service and various auxiliary information can be firstly packed or serialized, compressed, encrypted and the like according to a predefined format so as to be delivered to the originating service provider via a proper communication interface. Said various information may comprise for example client information of the service, execution status and the like. Correspondingly, after the originating service provider side receives the service, the service also needs to be decrypted, decompressed, unpacked and the like so as to be deployed. Those skilled in the art can understand that, the above packing/unpacking, compressing/decompressing and encrypting/decrypting operations can be performed in any known way in the field, which does not influence the implementation of the present invention.

By referring to FIGS. 5-7, the method of online purchasing a software service instance in the advantageous embodiment of the present invention and in which the software service is automatically deployed to the hosting environment of an originating service provider through cloning or moving during the service run-time is explained in detail as follows.

Figure 5:
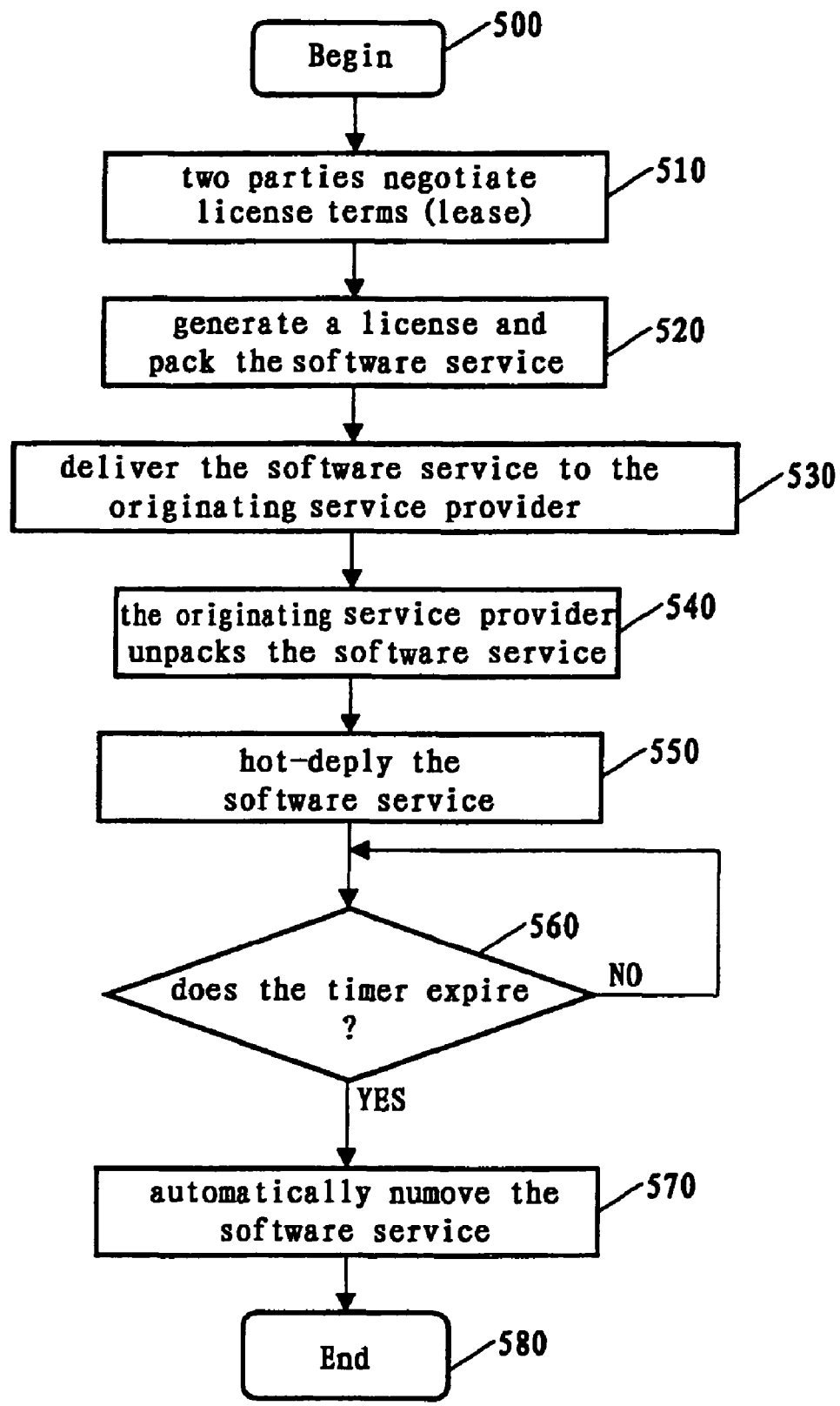
FIG. 5 is a flow diagram of one advantageous embodiment according to the present invention.

FIG. 5 illustrates such a case, i.e. an originating service provider thinks software service A executed by the $3^{rd}$ party service provider is useful for himself, but he cannot determine the future of software service A. Thus, for the sake of reducing risks, the originating service provider decides to firstly lease the service from the $3^{rd}$ party service provider during a period of time (e.g. 1 month).

The method according to the present invention begins with step S500 and subsequently enters into step S510, wherein the originating service provider and the third service provider negotiate license terms with respect to service A, and here is that the originating service provider leases the service for 1 month. Then, in step S520, the service bargainer of the $3^{rd}$ party service provider generates a license and requires the service packer to pack the service and the associated information (e.g. deployment description, and related entities, etc.), and the packed service is delivered to the originating service provider in step S530 through the service deliverer. In step S540, the originating service provider unpacks the received service through his unpacker. Subsequently, in step S550, the hot-deployer of the originating service provider deploys the service in the self-hosted environment during run-time so as to execute the service as needed. The license stipulates a timestamp over the use of the service, so the license manager of the originating service provider may time (e.g. through a timer) the use of the service, as shown in step S560. If the judgment in step S560 indicates the timer has not expired ("No" branch), the originating service provider can continue to use the service and the timing of the timer continues. When the judgment in step S560 indicates the timer has expired ("Yes" branch), the method of the present invention enters into step S570 and the service un-deployer of the originating service provider automatically removes the service from the hosting environment of the originating service provider. Then, the method of the present invention ends in step S580.

It should be understood that, FIG. 5 illustrates monitoring the performance of the license through the license manager of the originating service provider, but it is also apparent for those skilled in the art to monitor the performance of the license through the license manager of the $3^{rd}$ party service provider.

If the originating service provider desires to lease a certain software service all the time, he can purchase a license of the software service from the $3^{rd}$ party service provider. Under this condition, since there is no restriction of the timestamp, this process can be implemented by performing steps S500-S550 of FIG. 5.

Figure 6:
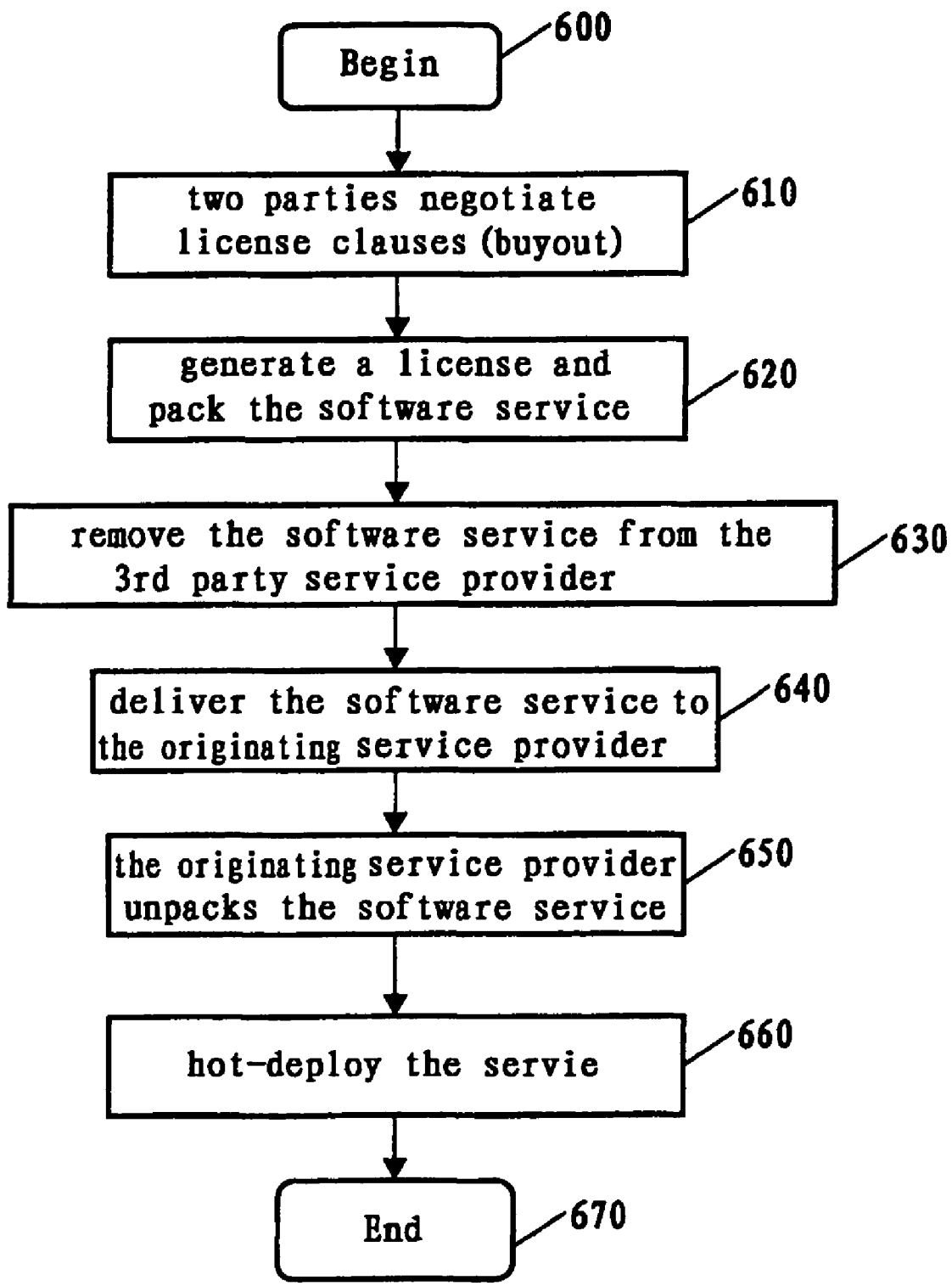
FIG. 6 is a flow diagram of the other advantageous embodiment according to the present invention.

FIG. 6 shows the case that an originating service provider hopes to buyout software service A executed by the $3^{rd}$ party service provider. So, the method according to the present invention adopts a moving mechanism to realize the process.

The method begins with step S600 and enters into step S610, wherein the originating service provider and the third service provider negotiate license terms for service A, and here is that the originating service provider buys the service. Next, in step S620, the service bargainer of the $3^{rd}$ party service provider generates a license and requires the service packer to pack the service and all the associated information (e.g. deployment description, and related entities, etc.). In addition, in step S630, the service un-deployer of the $3^{rd}$ party service provider completely removes the service from his self-hosted environment, which also includes client information, execution information of the service or other information. Then, the packed service is delivered to the originating service provider in step S640 through the service deliverer. In step S650, the originating service provider unpacks the received service through his unpacker. Subsequently, in step S660, the originating service provider deploys the service in the self-hosted environment through his hot-deployer during run-time so as to execute the service as needed. Then, the method of the present invention ends in step S670.

Figure 7:
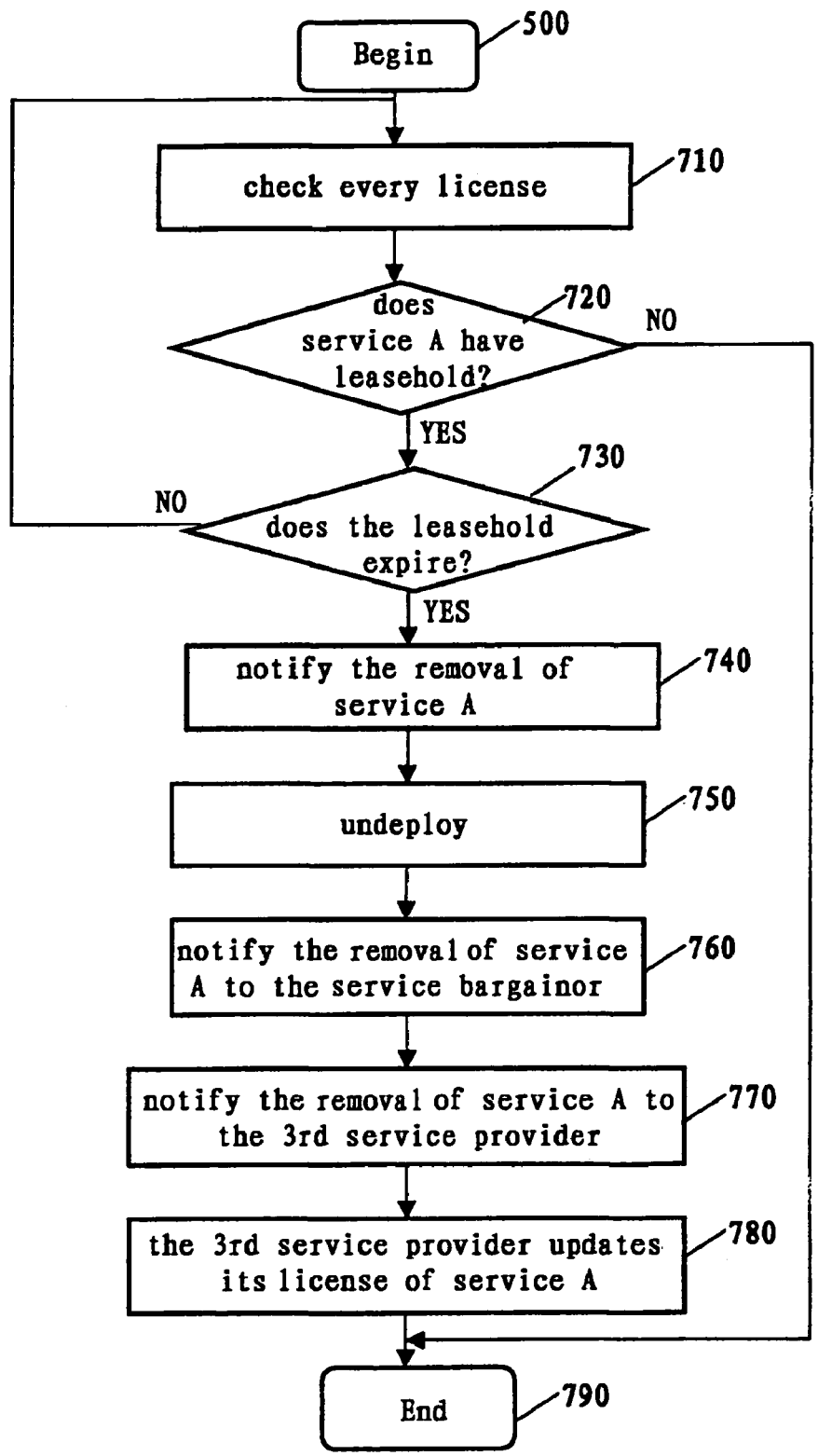
FIG. 7 is a flow diagram of performing the license according to the present invention.

By referring to FIG. 7 and taking the model of lease for 1 month for obtaining a service as an example, detailed explanations are made to the workflow of the license manager of the originating service provider.

The method according to the present invention begins with step S700 and enters into step S710, wherein the license manager can regularly check all the managed licenses. In step S720, the license manager judges whether or not a certain service A is a service with a timestamp or leasehold (e.g. 1 month). If "yes", the license manager checks in step S730 whether or not the leasehold expires. If in the step S730 the leasehold is judged to expire ("yes" branch), the method of the present invention enters into step S740, in which the license manager notifies the service un-deployer to remove the service A from the hosting environment of the originating service provider. Next, in step S750, the service un-deployer removes the service A. In step S760, the license manager notifies the removal of the service to the service bargainer of the originating service provider. The service bargainer of the originating service provider notifies in step S770 the cancellation of the service A's license to the service bargainer of the $3^{rd}$ party service provider. Then, in step S780, the license manager of the $3^{rd}$ party service provider updates its managed license of the service A to reflect the current license status of the service A. Subsequently, the method of the present invention ends in step S790.

Furthermore, if in step S720 the service is determined to be a service without a timestamp or leasehold, the method according to the present invention directly enters into S790. On the other hand, if in step S730 the leasehold is judged not to expire. ("No" branch), the method of the present invention returns to step S710 to repeat the step of checking the license.

Those skilled in the art can understand that, the above workflow performed by the license manager of the originating service provider obviously can be easily expanded to the license manager of the $3^{rd}$ party service provider.

Additionally, in the above-mentioned description of the present invention, a service provider directly communicates with the $3^{rd}$ party service provider to obtain a service. However, in a modification of the present invention, the $3^{rd}$ party service provider may issue his software service to a service mediator (not shown) and the originating service provider subscribes the desired service from the mediator. In this case, the foregoing flows in the present invention can also be easily applicable.

Those skilled in the art can understand that, the flows given by referring to the accompanying drawings describes in detail the method of the present invention. However, some steps in the above process can be deleted and the sequence can be changed as needed, which does not influence the implementation of the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may be embodied in a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in one or more computer-readable memories, where each such memory can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto one or more computers or other programmable data processing apparatus to cause a series of operational steps to be performed on the computers or other programmable apparatus to produce, on each such device, a computer implemented process such that the instructions which execute on the device provide steps for implementing the functions specified in the flowchart and/or block diagram block or blocks.

The advantageous embodiments of the present invention are explained as above. However, those skilled in the art will understand that, all the advantageous embodiments in the present invention are only given for purposes of illustration and description, but should not be construed as any restriction on the present invention. The present invention can be realized using software, hardware or a combination thereof. Those skilled in the art can obtain any modification and improvement relating to the present invention according to the above description, but the modification and improvements are all within the scope and spirits of the present invention as defined in the enclosed claims.

What is claimed is:

1. A method for enabling an originating service provider to automatically obtain and run, online, from a 3rd party service provider, a software service, the originating service provider and the 3rd party service provider both providing one or more software services, comprising the following steps:

the originating service provider negotiating a license with the 3rd party service provider over a certain software service run by the 3rd party service provider, the license stipulating life cycle information of the software service including a predetermined leasehold during which according to a timestamp of the software service, the software service can be run, and after which can be automatically removed, so that the originating service provider is able to automatically obtain the software service;

in response to an agreement of the license, performing:

the 3rd party service provider delivering, via a computer, the software service to the originating service provider after packing the software service with auxiliary information including at least one of client information of the service and execution status, the packing comprising compressing, encrypting and serializing, via a computer, the software service according to a predefined format and performed by a service packer;

the originating service provider unpacking and then deploying the software service, the unpacking comprising deserializing, decrypting, and decompressing, via a computer, the software service by a service unpacker according to the predefined format, wherein the originating service provider hot-deploys, in a self-hosted environment, the software service received from the 3rd party service provider;

wherein the license comprises modes for the originating service provider to automatically obtain the software service, the modes including at least one of: lease for period of time, buy a license and buyout; and determining, via a computer, which of the modes is agreed to by the $3^{rd}$ party service provider and the originating service provider;

in response to determining that the modes comprises the lease for period of time, performing:

the 3rd party service provider keeps the software service and a copy of its license in the originating service provider's self-hosted environment while the originating service provider or the 3rd party service provider monitors whether or not the leasehold expires;

the originating service provider or the 3rd party service provider uses its license manager to check licenses of all the hosted services;

the originating service provider or the 3rd party service provider uses its license manager to check whether or not the leasehold of the service expires and automatically removing the service from the hosting environment of the originating service provider when the leasehold expires, in response to determining that a certain service is the one with the leasehold; and updating the license of the service kept by the $3^{rd}$ party service provider in response to receiving notification that the service has been removed from the hosting environment of the originating service provider;

in response to determining that the modes comprises the buy a license, performing:

the 3rd party service provider keeps the software service and a copy of its license in the originating service provider's self-hosted environment;

in response to determining that the modes comprises the buyout, performing:

the 3rd party service provider integrally removes the software service from its self-hosted environment.

* * * * *